May 19, 1953
H. A. REINHARDT
2,638,960
APPARATUS FOR PRODUCING A NONWOVEN
SOFT-SURFACE FLOOR COVERING
Filed Dec. 18, 1952
3 Sheets-Sheet 1
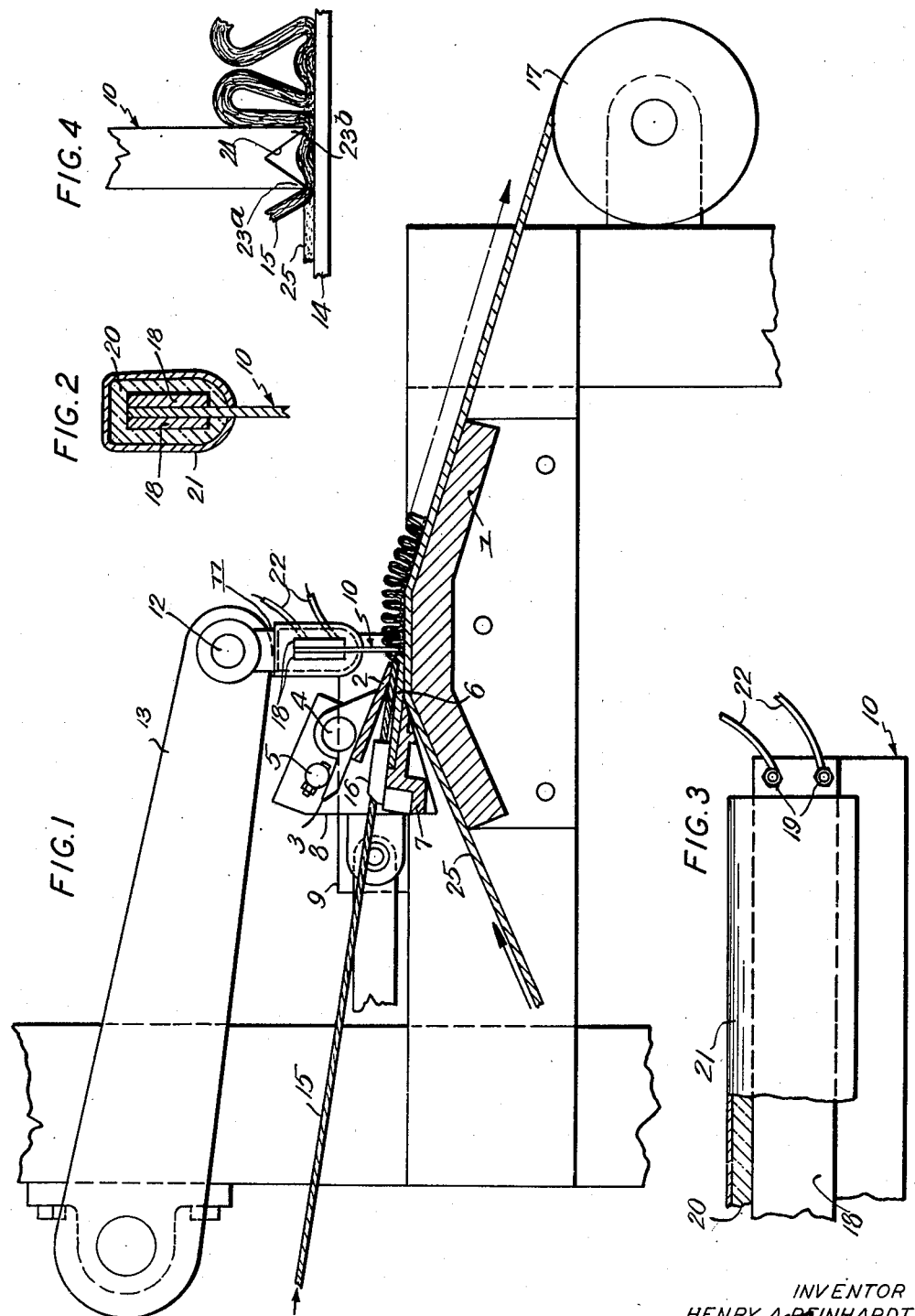
INVENTOR
HENRY A. REINHARDT
BY
ATT'Y.

May 19, 1953

H. A. REINHARDT 2,638,960

APPARATUS FOR PRODUCING A NONWOVEN
SOFT-SURFACE FLOOR COVERING

Filed Dec. 18, 1952

INVENTOR
HENRY A. REINHARDT
BY
ATT'Y.

Patented May 19, 1953

2,638,960

UNITED STATES PATENT OFFICE 2,638,960

APPARATUS FOR PRODUCING A NONWOVEN SOFT-SURFACE FLOOR COVERING

Henry A. Reinhardt, Longmeadow, Mass., assignor to Bigelow-Sanford Carpet Company, Inc., Thompsonville, Conn., a corporation of Delaware Application December 18, 1952, Serial No. 326,710

3 Claims. (Cl. 154—1.1)

The invention relates to apparatus for producing non-woven soft-surface floor coverings.

The invention provides a machine for producing a floor covering in which a soft-surface material is securely adhered in rows to a backing sheet by an adhesive, preferably a thermoresponsive adhesive.

The floor covering comprises soft-surface material in the form of upstanding pile-like rows extending across the width of a backing sheet. A feature of the product is that the soft-surface material is adhered to the backing sheet by being embedded, between said upstanding rows, in an adhesive along closely adjacent parallel lines, the adhesive being thicker between said lines than at said lines so that it is in the form of ridges, between said lines, to and in which the soft-surface material is secured. This thicker mass of adhesive between said lines assures a firm bond of the soft-surface material to the backing sheet. The adhesive material may be and preferably is one or more of the adhesive materials referred to below as suitable for use in my process, or it may be any other suitable adhesive material, suitably flexible when set.

My machine presses soft-surface material along lines extending across the width of a backing sheet to form a bight and apply the bight directly to and press it against and into the adhesive while the adhesive is in soft condition so that the soft-surface material is well embedded therein.

The adhesive, if thermoresponsive, is locally heated, i. e., heated only in the vicinity of said line, simultaneously with the pressing operation, and is then hardened, either by the heat or by subsequent cooling, and thereby creates on the lines along which the soft-surface material is pressed, a firm bond between the soft-surface material and the backing sheet.

The soft-surface material may be a sheet of felt or preferably a sheet of slivers or of pile yarns, as of wool. The backing sheet may be of any suitable flexible material, woven or unwoven, preferably burlap or paper.

The thermoresponsive adhesive for use in my process may be a thermoplastic adhesive, which is initially solid but is softened to receive the soft-surface material by the heat, such as a compound of polyvinyl acetate. Other satisfactory and suitable thermoplastic adhesives may be prepared by utilizing any of the following thermoplastic resin bases: polyvinyl acetate, polyvinyl chloride, polyvinyl acetals, polyvinylidene chloride, polyacrylates, or the copolymers of those resins, compounded by well known methods. Or the adhesive may be a thermosetting resin type of adhesive provided this is adequately plasticized or provided the end use to which my product is to be put does not demand that the product be highly flexible. Typical of the thermosetting resins which I have found effective are the urea-formaldehyde resin adhesives, the phenol-formaldehyde resin adhesives and similar adhesives based on thermosetting resins. Adhesives of this latter class are provided on the backing sheet with the resin in the A or B stage, from which state they are advanced by the application of heat to the insoluble, infusible C stage. I also may include the so-called thermoplastic-thermosetting resin adhesives, such as those formed from the reaction product of polyvinyl butyral with melamine formaldehyde, which may be solid initially but capable of being first softened and then solidified and set by the heat. While it is preferred, as indicated above, that the adhesive be liquid or semi-liquid as a paste, it is possible to use the adhesive in the form of a thin layer of powder suitably bonded to the backing sheet.

The adhesive may be plastisol paste type of adhesive, comprising a polyvinyl resin and a plasticizer as disclosed in the copending United States patent application of Charles R. Johnson, Serial No. 242,515, filed August 18, 1951.

The thickness of the coat of adhesive on the backing fabric may range from .005" to .040" as best suited to insure a firm bond with the surface material.

Other objects and features of this invention will appear from the following description in conjunction with the accompanying drawings and will be more particularly pointed out in the appended claims.

An illustrative embodiment of the invention is shown in the accompanying drawings, in which:

Fig. 1 is a side view in cross-section;

Fig. 2 is a side view in cross-section of one means of heating the blade of Fig. 1;

Fig. 3 is a front view partly in elevation and partly in cross-section of the same heating means;

Fig. 4 is an enlarged diagrammatic side view in cross-section of the tip of the blade illustrating its mode of operation;

Figure 5:
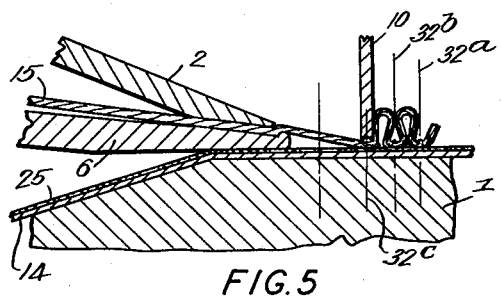
Figs. 5, 6, 7 and 8 are diagrammatic side views in cross-section illustrating a cycle of operation.

The mechanism illustrated in Fig. 1 comprises the following related parts; backing sheet support 1 mounted on machine framework; upper soft-surface material gripper 2 with carrier 3 pivotally mounted on shaft 4 and controlled by a cam on shaft 5; lower soft-surface material gripper 6 mounted on support 7; the complete gripper assembly mounted on end bracket 8 slidably mounted in grooved bracket 9; heated blade 10 carried in arms 11 mounted on shaft 12 pivoted in the end of arm 13; backing sheet 14 with thermoresponsive adhesive coating 25; sheet of soft-surface material 15; soft-surface material guide 16 fastened to support 7; and spike roll 17. The movable parts in conjunction with each other and the stationary parts are so controlled and operated as to direction, speed, amount of motion, and timing by suitable related mechanism that they produce the desired cycles and results hereinafter described.

The blade 10, Fig. 2, is heated by the heating elements 18 secured to its upper portion by nuts and bolts 19. These parts, except the downwardly protruding edge of the blade, are insulated by asbestos packing 20 and enclosed in a sheet metal cover 21, through the bottom of which the blade extends.

The heating elements 18, Fig. 3, extend laterally beyond the cover 21 where the nuts and bolts 19 serve as terminals for wires 22 leading from a source of supply of electrical current which heats the elements and the blade.

The temperature of the blade may range from 375° F. to 700° F., depending upon the type of adhesive. The dwell or length of time during which the heated blade is allowed to press the soft-surface material into the adhesive, is of such duration that the heat of the blade does not char or otherwise injure the soft-surface material. I have found that a temperature of 550° F. to 575° F. and a dwell of five to two seconds duration are preferable and most satisfactory to activate the thermoresponsive adhesive sufficiently, without deleteriously affecting the soft-surface material, and to cause that material to adhere to the backing fabric.

The blade 10 may be formed of a single piece of metal machined and ground to form opposite edges 23a and 23b respectively, with a groove 24 centrally located between them. The blade, however, may consist of two separate parts, each having an oppositely ground edge to provide the groove and edges described. The latter are not sufficiently sharp to cut or otherwise damage the soft-surface material 15. Groove 24 by proper machining and grinding may be formed into any desired shape such as a semi-circle or a gothic arch. When the heated blade presses the soft-surface material into the soft adhesive 25, a pocket is created within the groove between its edges, Fig. 4, in which some of the adhesive is retained and is not pressed out sidewise, so that a substantial amount thereof remains beneath the blade, thereby firmly embedding the soft-surface material in the adhesive along closely-adjacent parallel lines beneath the edges of the blade and forming the adhesive material into ridges, between these lines, to and in which the soft-surface material is secured, thereby effecting a strong bond between the soft-surface material and the backing sheet.

A process or cycle performed with the aid of this apparatus is illustrated in Figs. 5, 6, 7 and 8.

The heated blade 10, Fig. 5, presses the soft-surface material 15 along line 32c from one side of said material to the other against the adhesive 25 on the upper surface of the backing fabric 14 on the cloth support 1. The adhesive along line 32c, is rendered soft and tacky by the heat of the blade, if it is not already soft. The adhesive along lines 32a and 32b has already set to form a portion of the completed fabric. The lower edge of the heated blade has been carried forward by the advance of the completed fabric thereby tilting the blade slightly to the right. Upper gripper 2 and lower gripper 6 are in retracted position and gripping the soft-surface material 15.

Figure 6:
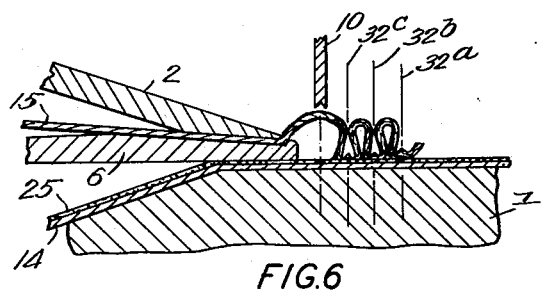

As grippers 2 and 6 advance to form slack in the soft-surface material 15 the heated blade rises and swings back to the position shown in Fig. 6, while the backing fabric 14 is at rest on the cloth support 1.

Figure 7:
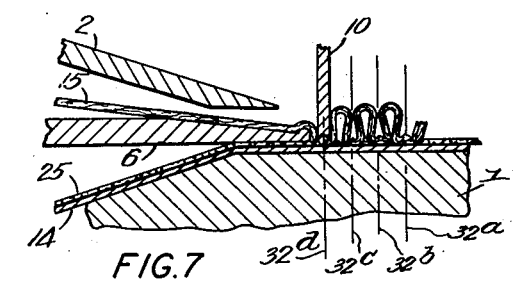

The heated blade then descends, Fig. 7, and presses the soft-surface material along line 32d against the adhesive on the backing fabric and renders it tacky and soft (if not initially soft) and the blade presses the surface material into the soft adhesive. The upper gripper 2 rises and releases its grip on the surface material. The heat of the blade then sets the adhesive if it is of the heat-setting type.

Figure 8:
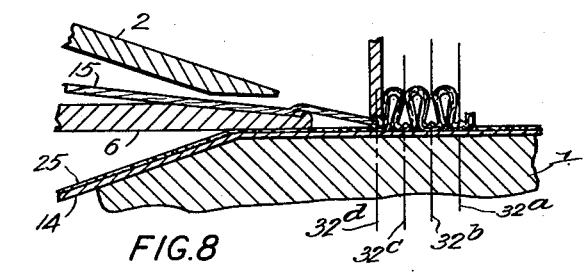

The edge of the heated blade and the fabric are advanced, Fig. 8, a distance equal to that between two successive lines of adhesion by the spike roll 17, Fig. 1, while the blade continues to press upon the soft-surface material. The grippers 2 and 6 are retracted to the position in which they may again seize the soft-surface material 15, thus completing the cycle.

The distance the grippers move forward from their retracted position, Fig. 5, to their advanced position, Fig. 6, is substantially equal to the difference between the length of the curve of the material between two successive lines of adhesion and the width of the space between the two lines. As this difference is a function of the height of the loop of the material, this height is determined by the amount the grippers move forward. The extreme breadth of the loop, i. e., the length between two successive lines of adhesion, is equal to the distance the backing fabric is drawn forward by the spike roll 17.

Figure 9:
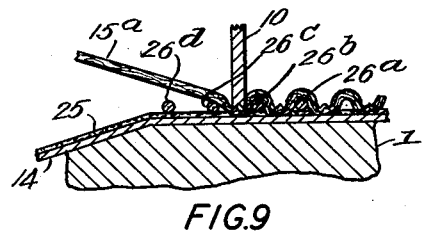
Figs. 9 and 10 are diagrammatic side views in cross-section, illustrating a cycle of a modification.
Figure 10:
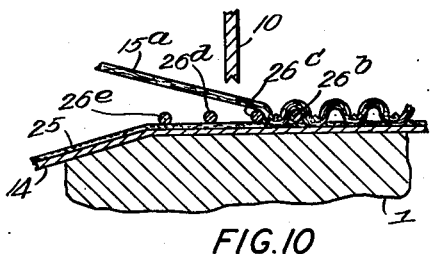

Referring to Figs. 9 and 10, in this modification the backing sheet 14, Fig. 9, with its coat of adhesive 25 rests on support 1. A sheet of pile yarns 15a leads directly from pile yarn guide 16, Fig. 1, over wire 26c and down under the edge of the heated blade 10 which presses the yarns against and into the adhesive midway between wires 26b and 26c. The wires 26a, 26b, 26c and 26d have been inserted and are later withdrawn according to the conventional Velvet or Wilton wire motion.

In Fig. 10 the heated blade has risen vertically clear of the pile yarns and the entire fabric and the inserted wires have been drawn forward over support 1 a distance equal to that between the axes of two successive wires by spike roll 17, Fig. 1. Wire 26a, shown in Fig. 9, has been withdrawn and another wire 26e has been inserted behind wire 26d a distance equal to that between two successive lines of adhesion. The heated blade is about to descend to press the yarns against and into the adhesive on the line between wires 26c and 26d.

In this modification a cut or an uncut pile fabric may be produced depending on whether the wires are equipped with the usual knives or not.

Figure 11:
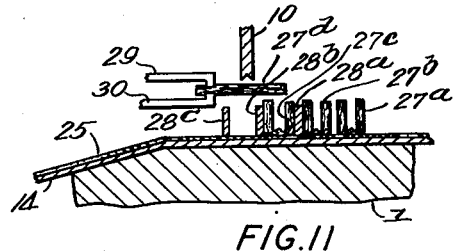
Figs. 11, 12 and 13 are diagrammatic side views in cross-section illustrating a cycle of a further modification.
Figure 12:
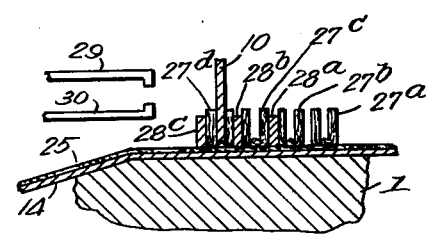
Figure 13:
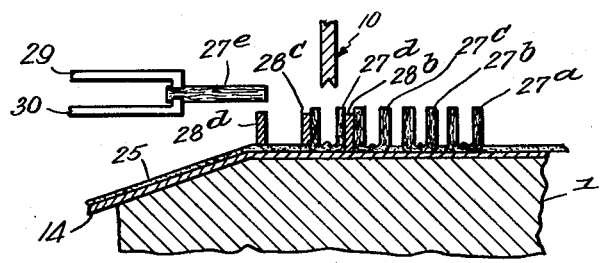
Figure 14:
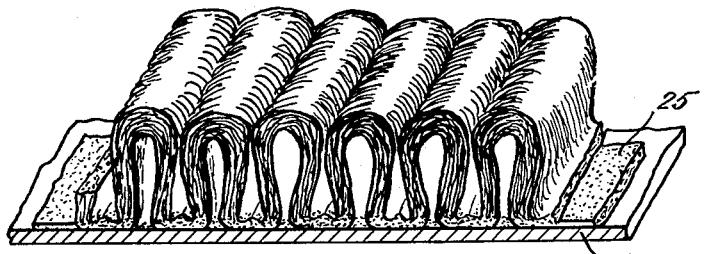
Fig. 14 is a perspective view partly in cross-section of the completed floor covering.

Another modification is illustrated in Figs. 11, 12 and 13. In Fig. 11 equal cut lengths of pile yarn have been formed into U-shaped tufts 27a, 27b, and 27c, by previous steps in the cycle and other cut tuft lengths 27d are in position to be applied to the adhesive coating on the backing fabric at rest on cloth support 1. Guide wires 28a, 28b and 28c have been inserted, as by the conventional wire motion, to aid in the formation of the tufts. Axminister nippers 29 and 30, which operate in a manner well known to the art, for example as described in U. S. Patent No. 1,709,572, or U. S. Patent No. 2,076,785, have fed cut tuft lengths 27d underneath the edge of the blade 10 and over the space between guide wires 28b and 28c. Blade 10 is in position to contact with lengths 27d at their midpoints so that the legs of the U-shaped tufts may be equal.

The heated blade 10 descends, Fig. 12, to form U-shaped tufts which are firmly secured at their lowest central points between adjacent guide wires by the adhesive to the backing sheet. As the blade starts to carry lengths 27d down, nippers 29 and 30 release their grip on said lengths and are retracted to seize new lengths of pile yarn.

In Fig. 13 guide wire 28a, Fig. 11, has been withdrawn and another guide wire 28d has been inserted behind guide wire 28c a distance equal to that between two successive lines of adhesion. Nippers 29 and 30 have seized new lengths 27e of pile yarn. Blade 10 has been raised and backing fabric 14 is still at rest on support 1.

Following the above step and to complete the cycle, the backing sheet with the attached U-shaped tufts and the guide wires, is drawn forward over the support by the spike roll 17, Fig. 1, a distance equal to that between the midpoints of two successive guide wires to the position shown in Fig. 11.

Although the operations above described are employed to produce fabrics with rows of loops or tufts running at right angles to the longitudinal direction of the fabric, it will be understood that by proper modification and location of related parts of the mechanism and of the materials the loops or tufts may be applied so that the rows may lie across the fabric at any desired angle. Likewise it will be understood that in the processes hereinbefore described more than one blade may be used by proper modification and location of related parts of the mechanism and materials.

Also, it will be readily seen that the heat may be supplied in ways other than that hereinbefore illustrated and described.

The above drawings and description are given for the sake of clarity and illustrative purposes and not in a limiting sense. Further modifications may be made, all of which are comprehended within the scope of the appended claims.

The process and product disclosed herein are claimed in my copending application Serial No. 255,232, filed November 7, 1951.

The present application is a division of my prior application Serial No. 255,232, filed November 7, 1951 which is a continuation-in-part of my prior application Serial No. 202,859 filed December 27, 1950, now abandoned, which in turn is a division of my prior application Serial No. 663,592, now abandoned, filed jointly with Charles R. Johnson on April 19, 1946.

Having described my invention, I claim:

1. An apparatus for producing a floor covering having a soft-surface material securely adhered in transverse lines or rows to a backing sheet by an adhesive, which comprises means for coating the backing sheet with an adhesive, an anvil over which the coated sheet is fed and intermittently caused to dwell during the attaching of the surface material to said coated backing sheet, a pair of grippers to grip the surface material and feed it into position over the backing sheet when said sheet is on the anvil, means for pressing bights of the surface material against the adhesive on said backing sheet while said backing sheet dwells on said anvil, means for heating the adhesive material between the bottoms of the bights of the surface material and the backing sheet, and means for feeding the backing sheet with its coat of adhesive material onto the anvil and for advancing the backing sheet with the affixed surface material thereon by a distance equal to that between two rows of the attached surface material.

2. An apparatus for producing a floor covering having a soft-surface material securely adhered in transverse lines or rows to a backing sheet by an adhesive, which comprises means for coating the backing sheet with an adhesive, an anvil over which the coated sheet is fed and intermittently caused to dwell during the attaching of the surface material to said coated backing sheet, means for supplying a continuous length of soft-surface material, a pair of grippers to grip the surface material and feed it into position over the backing sheet when said sheet is on the anvil, means for pressing bights of the surface material against the adhesive on said backing sheet while said backing sheet dwells on said anvil, means for simultaneously heating the adhesive material between the bottoms of the bights of the surface material and the backing sheet, and means for feeding the backing sheet with its coat of adhesive material onto the anvil and for advancing the backing sheet with the affixed surface material thereon by a distance equal to that between two rows of the attached surface material.

3. An apparatus for producing a floor covering having a soft-surface material securely adhered in transverse lines or rows to a backing sheet by an adhesive, which comprises means for coating the backing sheet with an adhesive, an anvil over which the coated sheet is fed and intermittently caused to dwell during the attaching of the surface material to said coated backing sheet, a pair of grippers to carry cut tuft lengths of surface material into position over the backing sheet when said sheet is on the anvil, means for pressing bights of the surface material against the adhesive on said backing sheet while said backing sheet dwells on said anvil, means for simultaneously heating the adhesive material between the bottoms of the bights of the surface material and the backing sheet, and means for feeding the backing sheet with its coat of adhesive material onto the anvil and for advancing the backing sheet with the affixed surface material thereon by a distance equal to that between two rows of the attached surface material.

HENRY A. REINHARDT.

References Cited in the file of this patent

UNITED STATES PATENTS

| Number | Name | Date |
| --- | --- | --- |
| 1,822,509 | Smith | Sept. 8, 1931 |
| 1,945,700 | O'Brien et al. | Feb. 6, 1934 |